United States Patent
Wang et al.

(10) Patent No.: US 6,905,719 B2
(45) Date of Patent: *Jun. 14, 2005

(54) SHELF-STABLE, BAKEABLE SAVORY CHEESE PRODUCT AND PROCESS FOR PREPARING IT

(75) Inventors: Chii-Fen Wang, Princeton, NJ (US); Zhen-Yi Yan, East Hanover, NJ (US); Harry Levine, Morris Plains, NJ (US); Louise Slade, Morris Plains, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/059,843

(22) Filed: Jan. 30, 2002

(65) Prior Publication Data

US 2002/0197354 A1 Dec. 26, 2002

Related U.S. Application Data

(60) Provisional application No. 60/266,150, filed on Feb. 2, 2001.

(51) Int. Cl.⁷ .................................................. A23G 3/00
(52) U.S. Cl. .................. 426/94; 426/549; 426/582; 426/601; 426/602; 426/658
(58) Field of Search ............................ 426/93, 94, 548, 426/549, 580, 582, 601, 602, 658, 659, 660

(56) References Cited

U.S. PATENT DOCUMENTS

| | | |
|---|---|---|
| 3,741,774 A | 6/1973 | Burkwall |
| 4,752,494 A | 6/1988 | Tang et al. |
| 5,529,801 A | 6/1996 | Morano |
| 5,601,863 A | 2/1997 | Borden et al. |
| 5,935,634 A | 8/1999 | Gamay et al. |
| 6,210,723 B1 | 4/2001 | Coleman et al. |

*Primary Examiner*—Leslie Wong
(74) *Attorney, Agent, or Firm*—Thaddius J. Carvis; Thomas A. Marcoux

(57) ABSTRACT

A savory, smooth-textured, bakeable and shelf-stable product is prepared as a three-phase formulation, including an aqueous liquid phase, a dispersed fat phase and a solids phase, preferably containing a savory ingredient, preferably a cheese flavoring component, in significant proportion. The liquid phase is present in sufficient quantity to suspend and disperse the fat and solids phases and to have sufficient dissolved solids and humectants to raise the viscosity for this phase sufficiently to result in a creamy texture for the final product. The savory flavor ingredients are present as undissolved solids of sufficiently small particle size to provide the proper flavor release for the flavor and a texture consistent with the savory flavor. Preferred cheese products will have a lubricous, slippery, smooth mouthfeel and a flavor release that endures until the palate is essentially clean. The product can be applied to unbaked doughs prior to baking and retain their desired properties after baking. The product can also be packaged for use as is with any number of complimentary foods.

23 Claims, No Drawings

SHELF-STABLE, BAKEABLE SAVORY CHEESE PRODUCT AND PROCESS FOR PREPARING IT

RELATED APPLICATION

This application claims priority based on U.S. Provisional Application 60/266,150 filed Feb. 2, 2001.

BACKGROUND OF THE INVENTION

The invention relates to a shelf-stable, bake-stable, smooth-textured cheese product, other bakeable savory spread and filler compositions and to processes for preparing them. The savory, especially cheese, products provide a number of product variations and combinations.

Cheese is a favorite that extends across generations and cultures. In America and Europe, in particular, people enjoy cheese at any meal and at many times in between. One very desirable combination with cheese is to serve it with some form of baked goods. Bread and crackers are popular choices and there are, in fact, cheese-flavored breads and crackers available on the market. Other combinations of this type employ a shelf-stable cheese filler in combination with pretzels, crackers, puffed snacks and the like. Products of these types are satisfactory to some extent, but the cheese filler lacks a desired creaminess and smooth melt that would be desired. Also, the crackers must be baked first and then filled. There is no known technology to add a cheese filler to an unbaked dough and achieve a baked product having suitable texture, flavor and shelf-stability.

In U.S. Pat. No. 3,741,774, Burkwall, used the term "shelf-stability" in his context, to define a single property, i e., microbiological stability. Burkwall provided a simulated cheese product containing 5 to 35% of sugar or sugar equivalents to lower the osmotic pressure of the cheese to "render it substantially free from bacteriological problems". The high water content (20–40% by weight) of Burkwall's product requires the presence of a high sugar content in order to achieve microbiological stability. However, the provision of large amounts of sugars (13 parts sucrose versus 5 parts cheese in the Example) is largely incompatible with savory flavors such as cheese. The high percentage of protein binding agents (10% to 50% by weight) and starch (5% to 30% by weight) are also incompatible with the provision of a smooth and creamy texture necessary for a good cheese filler.

As a practical matter, the property of "shelf stability" requires more than microbiological stability. Indeed, there are a number of organoleptic and rheological criteria that must be met before a product can be considered "shelf stable". There is a technical challenge in modifying a savory food such as cheese such that it becomes shelf stable and stable to baking, i.e., bakeable, without sacrificing its flavor or creamy texture.

To be fully shelf stable, a product must maintain its texture. The savory food must also retain its flavor, and it must not adversely affect that of a copackaged baked dough such as is found in pretzels, crackers or puffed snacks, such as cheese-filled puffed snacks, e.g., cheese balls, in terms of taste, texture or color. This means that the baked dough portion of the composite product must maintain a crisp texture. It must not become soggy due either to the migration of moisture from the cheese or oil-soaked due to the release of oil, i.e., so-called "oil out" from the cheese.

The problem of oil release from the cheese is a particular problem. Oil release affects the texture of baked dough as well as its flavor and color. Moreover, when oil is released from the cheese, the flavor and texture of the cheese are also altered. In U.S. Pat. No. 5,935,634, Gamay, et al., describe a low-water activity cheese product containing 40 to 70% cheese and utilizing 1 to 10% lactose and 2 to 15% of a humectant to provide shelf stability. The examples reporting satisfactory results and utilizing the claimed amounts of cheese also included over 5% of sugars and alkali metal lactates. It would be desirable to achieve shelf stability without utilizing either sugars or lactates. And, it would be desirable to achieve this in a product that was stable to the heat of baking and showed minimal if any oil release initially and over time.

In the case of cheese products, it is important to provide significant quantities of cheese. In U.S. Pat. No. 4,752,494, for example, Tang, et al., describe a "thermostable cream" containing any one of a variety of flavors, including savory flavors, in a formulation designed to achieve their objectives. Essential to meet their objectives is the presence of $Ca^{++}$ ions, caseinate ions and corn syrup. While they refer to their product as savory, the sole example on cheese-flavored fillers employs about 10% cheese (in the form of cheese powder) and more than 50% corn syrup. The product is said to withstand baking and be shelf stable, but the presence of the binder and the large amounts of sugars in the corn syrup will seriously detract from a desirable cheese flavor and texture.

In U.S. Pat. No. 5,529,801, Morano points out that products of the type produced by Tang, et al., suffer from a common problem in the art when dealing with water-soluble gelling agents, whether protein or carbohydrate based. Typically, these products require significant water contents to hydrate the gelling agent. Morano would like to provide an essentially water free product and proposes the use of an ultra high surface area cellulose which is able to hydrate in a hydrophilic liquid phase comprised of an edible polyol humectant. Thus, this composition requires the presence of a particular form of cellulose to avoid the need for water, and fats are preferably avoided because the product is desired to be fat free. It would be desirable, however, to meet the challenge of providing a bakeable cheese filler without resorting to adding cellulose or decreasing fat.

There is a need for a process that would enable modifying a normally unstable, savory food such as cheese to render it stable to the heat of baking without sacrificing its flavor or creamy texture. As used herein, the terms "bakeable", "bake-stable" and "stable to baking" are used interchangeably and refer to a minimal heat stability of a cheese filling within a composite baked dough and savory filling product, such as a filled pretzel, cracker or puffed snack, to maintain suitable homogeneity and rheology and to remain acceptable as a filling without significantly degrading the baked dough. Among the puffed snack products are starch-based snack products, possibly extruded, such as cheese balls and the like. Products such as cheese-filled cheese balls can be coextruded as an enrobed "rope" of the savory filling within a "rope" of dough that is fully cooked, e.g., baked, during forming by extrusion or thereafter. Products of this type can be made by a number of techniques, such as, for example, as described in U.S. Pat. No. 6,210,723. For example, , a cheese filler is extruded within a casing which consists of an unbaked dough which typically would comprise a corn or wheat flour and/or starch. In this context, the terms "bakeable" and "bake stable" refer to rheological and homogeneity stability at savory filler composition temperatures in the range of 115° C.±5%. Such temperatures would be encountered for example, in a filled extruded product, such as a cheese filled puffed snack, prepared using an extrusion process wherein the temperature of the extruder at the tip of the extruder die would reach 155° C.–160° C. Such temperatures are sufficient to cook the unbaked dough surrounding the cheese filler. That is, their temperatures are sufficient to gelatinize the corn or wheat starch which typically would be in the casing surrounding the cheese filler, and such temperatures would ensure that raw flavor notes in the starch would be eliminated or minimized.

In the case of filled cheese and cracker-type products it would also be desirable for the cheese balls or crackers to maintain their crisp textures—not becoming soggy due either to the migration of moisture from the cheese or oil-soaked and off-flavored due to the release of oil, i.e., so-called "oil out" from the cheese.

DISCLOSURE OF INVENTION

Accordingly, it is an object of the invention to provide a shelf-stable, bakeable, smooth-textured cheese product.

It is another object of the invention to provide other bakeable savory spreads and fillers.

It is another object of the invention to provide processes for preparing shelf-stable, bakeable, smooth-textured cheese products and other bakeable savory spreads and fillers.

It is another and specific object of the invention to provide a process that enables processing a normally unbakeable, savory food such as cheese and modifying it such that it becomes bakeable without sacrificing its flavor or a creamy texture expected of processed cheese.

It is yet another and more specific object of the invention to provide a process that enables processing cheese, a normally savory and unbakeable food, and modifying it to make it bakeable without sacrificing its flavor or a creamy texture expected of processed cheese.

It is yet another and specific object of the invention to provide a process that enables adding a cheese filler to an unbaked dough and baking the resulting composite to provide a product having suitable cheese and cracker textures and flavors, with shelf-stability, wherein the cheese filler remains smooth and creamy with good cheese flavor and the cracker maintains its crisp texture—not becoming soggy due either to the migration of moisture from the cheese or oil-soaked due to the release of oil from the cheese.

It is yet another object of the invention to provide a range of products of the savory type which can be provided in a variety of product forms, both baked and unbaked, and adaptable for other uses by the consumer, e.g., cheese spread that can be used as is or baked.

It is another object of the invention to provide unique baked products of a type not heretofore possible.

It is a more specific object of the invention to provide a shelf-stable cheese product that can be added to dough prior to forming or baking and to provide processes for preparing the cheese product and the combined dough and cheese products.

These and other objects are realized by the present invention, which provides both a process for preparing a shelf-stable savory, e.g., cheese, product and the products, baked and unbaked, having improved properties.

In one aspect of the invention, a savory, smooth-textured, bakeable and shelf-stable cheese product is provided. The cheese product comprises: a) a dispersed fat phase comprised of fat in an amount of at least 0.5%, typically at least 2% and preferably at least 5%, but less than 40% and preferably less than 35% by weight of the total weight of the cheese product; b) an aqueous liquid phase comprising water in an amount of at least 3% by weight based on the total weight of the cheese product, a polyol in an amount of at least 50% by weight of the aqueous phase and dissolved soluble solids, the combined amount of the polyol and the dissolved soluble solids being sufficient to provide the total cheese product with an $A_w$ of less than 0.8, preferably less than 0.5 and more preferably less than 0.4 for cracker-like products and less than 0.7 for products that will be baked or toasted before serving, and c) a solids phase, containing cheese flavor in an amount sufficient to comprise at least 5%, preferably at least 8%, and most preferably at least 15% by weight of the total weight of the cheese product.

In another aspect of the invention, a savory, smooth-textured, bakeable and shelf-stable product is provided. The savory product comprises: a) a dispersed fat phase comprised of fat in an amount of at least 0.5%, typically at least 2% and preferably at least 5% but less than 40% and preferably less than 35% by, weight of the total weight of the savory product; b) an aqueous liquid phase comprising a polyol in an amount of at least 50% by weight of the aqueous phase and dissolved soluble solids, the combined amount of the polyol and the dissolved soluble solids being sufficient to provide the total savory product with an $A_w$ of less than 0.8, preferably less than 0.5 and more preferably less than 0.4 for cracker-like products and less than 0.7 for products that will be baked or toasted before serving; and c) a solids phase, containing a savory flavoring in an amount sufficient to comprise at least 15%, preferably at least 35%, by weight of the total weight of the savory product.

In another of its several aspects, the invention provides a process for preparing a savory, smooth-textured, bakeable and shelf-stable cheese product. The process comprises: providing ingredients for forming a) a dispersed fat phase comprised of fat in an amount of at least 0.5%, typically at least 2% and preferably at least 5% but less than 40% and preferably less than 35 % by weight of the total weight of the cheese product; b) an aqueous liquid phase comprising a polyol in an amount of at least 50% by weight of the aqueous phase and dissolved soluble solids, the combined amount of the polyol and the dissolved soluble solids being sufficient to provide the total cheese product with an $A_w$ of less than 0.8, preferably less than 0.5 and more preferably less than 0.4 for cracker-like products and less than 0.7 for products that will be baked or toasted before serving; and c) a solids phase, containing cheese in an amount sufficient to comprise at least 5%, preferably at least 8%, by weight of the total weight of the cheese product; and mixing the ingredients sufficiently to provide a uniform blend.

In another aspect the invention provides a process for preparing a savory, smooth-textured, bakeable and shelf-stable product. The process comprises: providing ingredients for forming a) a dispersed fat phase comprised of fat in an amount of at least 0.5%, typically at least 2% and preferably at least 5%, but less than 40% and preferably less than 35% by weight of the total weight of the savory product; b) an aqueous liquid phase comprising a polyol in an amount of at least 50% by weight of the aqueous phase and dissolved soluble solids, the combined amount of the polyol and the dissolved soluble solids being sufficient to provide the total savory product with an $A_w$ of less than 0.8, preferably less than 0.5 and more preferably less than 0.4 for cracker-like products and less than 0.7 for products that will be baked or toasted before serving; and c) a solids phase, containing savory flavoring in an amount sufficient to comprise at least 15%, preferably at least 35%, by weight of the total weight of the savory product; and mixing the ingredients sufficiently to provide a uniform blend.

In another aspect of the invention, a process is provided for preparing a cheese and dough composite product comprising at least one discrete region of a cheese product as described above and at least one discrete region of a dough, preferably baked to a crisp texture.

In yet another aspect, the invention provides savory products as described above, packaged in sealed containers, e.g., of either rigid or flexible construction. In one embodiment, a flexible plastic tube is provided for squeezing the cheese or other savory product onto or into a cooked or raw food product for eating as is or after cooking.

Other preferred aspects of the invention will be detailed below.

DETAILED DESCRIPTION OF THE INVENTION

The invention will be described below with specific reference to preferred savory filler formulations, composite baked dough and filler products and processing techniques; however, it will be clear to the experienced food scientist that the principles that enable improvements in these will apply to other products as well.

The savory filler products of the invention provide unique combinations of often competing properties of being savory, smooth-textured, bakeable and shelf-stable. They achieve these properties by providing a unique three-phase combination, including an aqueous liquid phase, a dispersed fat phase and a solids phase, preferably containing cheese in very significant amounts. Before we describe the composite baked dough and filler products of the invention, we will describe the composition and preparation of the savory filler compositions that make them possible.

Savory Filler Compositions

The savory filler compositions of the invention comprise:

a) a dispersed fat phase comprised of triglyceride fat in an amount of at least 0.5% but less than 40% by weight of the total weight of the cheese product;

b) an aqueous liquid phase comprising water in an amount of at least 3% by weight based on the total weight of the cheese product and a polyol in an amount of at least 50% by weight of the aqueous phase and dissolved soluble solids, the combined amount of the polyol and the dissolved soluble solids being sufficient to provide the total cheese product with an $A_w$ of less than 0.8, and c) a solids phase, containing cheese flavor in a amount sufficient to comprise at least 15% by weight of the total weight of the cheese product;

d) not more than 20% by weight lactose based on the total weight of the filler composition.

In the context of this application, by "bake stable" we mean that the filler composition is resistant to degradation at temperatures of up to 115° C.±5° C. Since fillers may to an extent be insulated from actual baking temperatures by surrounding dough, a filler which is stable to a given temperature, such as 115° C., is suitable for use in a composite filled dough product which may be subjected to substantially higher cooking temperatures than 115° C.

Fillers which lack stability at a given temperature may become hard, dry, may oil out, may spread and perhaps brown. Browning is partially the result of thermal degradation of sugars, such as lactose. Also, sugars such as lactose may crystallize upon cooling from elevated temperatures, leaving the filler with a grainy texture. An objective measure of hardening is the change in viscosity which a filler composition may undergo upon exposure to heat. While some increase in filler viscosity is acceptable, dramatic, e.g., increases of ten-fold or more, are indicia of poor bake stability. The complex viscosity of the unbaked savory product will typically be within the range of from about 400 to about 50,000, e.g., from about 400 to about 20,000, poises as measured at 25° C. and under stress from 0.1% strain. Such viscosity measurements may be performed, for example, using a Stress Rheometer, Model SR500 (Rheometric Scientific). Importantly, however, for products that are to be formed as sandwiches, like cheese between two crackers, the savory product should have sufficient viscosity in an unbaked condition to resist flow due to gravity or other moderate applied forces.

One simple screening test for bake stability in fillers involves observing the extent to which the filler spreads on a sheet when heated to a given temperature. If the spread test is conducted with the filler placed on a filter paper, the extent of "oil out" may also be observed. Oil out results in a ring of oil on the paper which will extend beyond the extent of the spread of the filler composition. Minimal spread and minimal oil out are indicia of bake stability.

The amount of aqueous liquid phase is important. The product must have a liquid phase in sufficient quantity to suspend and disperse the fat and solids phases and to have sufficient dissolved solids and humectants to raise the viscosity for this phase sufficiently to result in a creamy texture for the final product. A creamy lubricious, mouthfeel depends on the correct balance of liquid and solids phase materials.

It has also been found to be important that sufficient savory flavor ingredients are present as undissolved solids of sufficiently small particle size to provide the proper flavor release for the flavor and a texture consistent with the savory flavor. For example, the mouthfeel for cheese products should be smooth and creamy. Preferred cheese products will have a lubricous, slippery, smooth mouthfeel and a flavor release that endures until the palate is essentially clean. It would be unacceptable for the flavor to be completely released during the dissolution of only the liquid phase in saliva in the mouth, leaving an unflavored portion of undissolved solids.

With these general guidelines, we proceed with the discussion of preferred forms of the invention.

The dispersed fat phase is preferably comprised of triglyceride fat in an amount of at least 0.5%, typically at least 2% and preferably at least 5%, e.g., from about 7 to 40% (e.g., from more narrowly from 20 to 30%), by weight of the total weight of the cheese product. The fat provides a desirable mouthfeel that is expected of cheese products but is often missing in processed cheeses that have been first processed and then heat set. The fat phase of the products of the invention is present within the composition in a form that permits release in the mouth, but surprisingly does not migrate from it into a baked dough material. And, unlike the fat present in cheese or added heat-settable matrix materials, it is neither encapsulated—making it unavailable to the palate—nor expressed from the cheese during heat processing. Thus, the product of the invention is imbued with a very acceptable mouthfeel without causing taste or stability problems in the overall formulation. Oil and other liquids are important to provide enough liquid to the composition to give the product the proper texture without migrating into an associated dough portion. Desirable, the degree of spread should be less than about 1.0 cm and preferably less than 0.8 cm, e.g., less than 0.5 cm or even 0.2 cm, when tested by the procedure set out in Example 1.

The fat contained within the fat phase will preferably comprise a triglyceride fat and can be in any suitable physical form and from any particular source, whether animal, vegetable or synthesized. The terms fat and oils are used interchangeably in the art, the term fat often referring to solid materials and oil to those that are liquid, but most fats useful in food exhibit both liquid and solid components over the range of utility, so no distinction is meant herein. A fat is chosen to provide the correct amount of liquid in the formulation and may contain solid fat as well. Preferred fats have textures similar to those employed for soft (tub) margarine and can be similar in formulation to those. These fats are typically of semisolid consistency and can comprise any of the usual vegetable oils, preferably partially hydrogenated, but can also be non-hydrogenated or fully hydrogenated oils such as soybean, safflower, sunflower, high oleic sunflower, sesame, peanut, corn, olive, rice bran, babassu nut, palm, mustard seed, cottonseed, poppyseed, low erucic rapeseed, high erucic rapeseed, shea, marine, meadowfoam and the like oils. Synthesized and rearranged fats can also be employed. Preferred oils contain at least about 70%, preferably at least about 75%, $C_{18}$ acid residues (e.g., stearic, oleic, linoleic) and comprise oils such as peanut oil, olive oil, soybean oil, canola oil, sesame oil, and corn oil are especially desirable for some embodiments. Less preferred are animal fats such as tallow, lard, and dairy butter. Of course, incomplete esters and derivatives and waxes can be employed in minor amounts.

Semisolid fats are exemplary of suitable oils, e.g., those having an SFI profile exhibiting solids contents in the following ranges:

| Temperatures | Solids (%) |
|---|---|
| 50° F. | 9 to 50 |
| 70° F. | 2 to 25 |
| 92° F. | 8 maximum |

Fats of this specification have a semisolid consistency at room temperature, but essentially fully melt in the mouth. Fat substitutes, such as salatrim and olestra can also be employed as full or partial substitutes for the fat. It is noted that unlike olestra, salatrim is a triglyceride.

The aqueous liquid phase will typically comprise from at least 15% by weight of the savory product, preferably from about 20 to 40%, more narrowly from 25 to 35%. The aqueous liquid phase will comprise a polyol in an amount of at least 25%, e.g., at least 50% by weight of the aqueous phase and dissolved soluble solids. The combined amount of the polyol and the dissolved soluble solids will be sufficient to provide the total cheese product with a water activity, i.e., an $A_w$, of less than 0.8, and preferably less than 0.5 and more preferably less than 0.45. The water activity is an important factor in maintenance of both microbiological and textural stability of the savory product and any composite it is used to make. The water activity of a product can be simply measured by equilibrating a product in a sealed container and then measuring the relative humidity of the headspace. In essence, it is a measure of the driving force for moisture migration. Moisture will migrate from a region of higher water activity to lower water activity. Therefore, for the cheese and baked goods combinations of the invention, it will be necessary to carefully control the water activities of the savory product so that it will be compatible with that of the baked good—neither giving up or receiving moisture. Water should be present in the aqueous phase in an amount of at least about 3% based on the weight of the cheese product, and preferably in an amount of at least about 4% based on the weight of the cheese product. Such water may be either added directly or as part of another ingredient, such as polydextrose solution.

The aqueous liquid phase will be present in sufficient quantity to suspend and disperse the fat and solids phases and to have sufficient dissolved solids and humectants to raise the viscosity for this phase sufficiently to result in a creamy texture for the final product. The viscosity of the liquid phase if measured prior to addition of the materials that make up the other phases will typically be within the range of from about 5 to about 30, e.g., from about 10 to about 20, poises as measured by a Stress Rheometer, Model SR5000 (Rheometric Scientific) at 25° C. and stress from 0.2 to 1000 dyne/cm$^2$.

To aid in obtaining the desired soft, creamy texture and to provide a controlled water activity in the product, a plasticizing polyhydric alcohol (humectant) is employed at a level of at least 4% up to 50%, but preferably from greater than 5%, up to about 20%. To the extent possible, the polyol will be minimized within these ranges. Suitable for use as the plasticizing agent are any of the normally liquid, edible di-, or tri-hydric alcohols or sugar alcohols or other polyhydric alcohols of suitable flavor and effective for this purpose. Prominent among these are glycerol and sorbitol, but others of this class and mixtures of these can be employed, for example hydrogenated starch hydrolysates. It has been found that due to its highly effective plasticizing effect and its flavor, glycerol is a preferred material. In some cases, a flavor modifier such as any of those mentioned in U.S. Pat. No. 5,641,795 can be employed in minor amounts, e.g., up to about 1.0%, say form 0.3 to 0.8 %, to suppress any undesired sweetness provided by glycerol, sorbitol, or the like. One such product comprises a lactisol-syrup solution (1% lactisol) and is sold under the trademark Super Envision by Domino Sugar.

In addition to the plasticizing polyol, the aqueous liquid must also contain sufficient other dissolved water-soluble materials capable of building viscosity in the liquid phase and arresting microbial growth in the composition. Among these are nonsweet carbohydrates such as polydextrose, and salts such as sodium chloride, being the preferred water activity, $A_w$, lowering materials. Among the preferred polydextrose materials are those that have been chemically reduced to eliminate their potential to reduce cooperating food ingredients. This type of polydextrose is described, for example, in U.S. Pat. No. 5,601,863, and can be purchased under the Trademark Litesse® Ultra from Danisco Sweeteners. The reduced polydextrose is a polyol and as such can be employed as part or all of the polyol component described above. Regular polydextrose can be employed in addition to the polyols at levels up to about 35% by weight of the total food product, e.g., from about 5 to 20%. Polydextrose is highly soluble in water, and is preferably not employed in amounts above its solubility limit. However, where its bulking capability is needed in a particular formulation, up to 5% can be insoluble. It will typically be added as an aqueous solution, e.g., about 70 to 80%, but can be added dry and blended into at least a part of the aqueous ingredients and dissolved.

The remaining of the distinct component phases is a solids phase, containing a savory flavor, preferably cheese flavor, in a significant amount, e.g., sufficient to comprise at least 5% preferably at least 8% and most preferably at least 15% by weight of the total weight of the savory product. As used herein, "cheese flavor" refers to commercially available cheese flavors which consist of from 10%–40% "cheese" as that term is generally understood (i.e. milk, cheese culture, salt and enzymes). The cheese content of such cheese flavors is typically a highly flavorful cheese, such as cheddar. In addition, the cheese flavor may contain optional ingredients such as whey, vegetable oil, whey protein concentrate, lactose, maltodextrin, salt, sodium phosphate, citric acid, lactic acid, natural flavor and other minor ingredients. Such a cheese flavor product is available, for example, from Kraft Food Ingredients, as a free-flowing powder under the brand name Sequoia II. Sequoia II contains 25% cheese, 25% whey, 12–14% partially hydrogenated soy oil, 10% whey protein concentrate, 10% lactose, 8–10% multodextrin, 5–7% salt, 3% sodium phosphate, 1% citric acid, 0.25% natural flavor and 0.25% lactic acid. (All percentages are approximate.)

Normally, significant cheese concentrations result in oil release on heating and migration thereafter. The upper limit for the amount of cheese flavor utilized in the filler of the present invention is determined by the need to provide enough fat and liquid phase components to achieve the objectives of the invention. Typically, no more than about 70% undissolved solids can be accommodated. Preferred savory products have considerably more than 15% of the cheese flavor or other solid savory flavor, e.g., at least 25% and preferably from over 30% up to 65%, e.g., 35 to 65%. In this context, the solids phase is distinguished from the fat phase in that the solids phase is not fat-continuous. Thus, while the preferred component of the savory filler is cheese, which contains fat, the cheese is not fat continuous but has a protein and carbohydrate matrix which encapsulates or otherwise includes the fat. For fillers containing lower amounts of solid cheese or other savory flavor within the above ranges, it may be desirable in some cases to add a minor amount of a starch (preferably cold water swellable modified starch). For example, a modified starch such as sold under the trademark UltraTEX by National Starch, can be effective in amounts sufficient to bring the insoluble solids content up to greater than about 20%, e.g., preferably at least 24%.

As another important consideration of the invention, it has been found to be important to have sufficient savory flavor ingredients present as undissolved solids of sufficiently small particle size to provide the proper mouthfeel, flavor release and texture consistent with the savory flavor. For example, the mouthfeel for cheese products should be smooth and creamy and the texture viscous enough to stay in place both before and after any heat treatment such as baking. Preferred cheese products will have a lubricous, slippery, smooth mouthfeel and a flavor release that endures until the palate is essentially clean. It would be unacceptable for the flavor to be completely released during the dissolution in saliva of only the liquid phase, leaving an unflavored portion of undissolved solids in the mouth.

The savory flavor is preferably principally provided by the flavor in solid form. For example, in the case of cheese, the flavor should come principally from a suitable cheese flavor ingredient, such as cheese powder flavor, that is substantially insoluble in the aqueous liquid phase. Suitable for use as the cheese ingredient other than materials that can technically be called cheese powders flavors are cheese products having a suitably small particle size and substantially equivalent properties and flavor. A preferred cheese powder flavor is, however, a cheese powder flavor of the approximate composition as the Sequoia brand cheese flavor described above.

In addition to solid cheese flavors, other like solid savory flavors can be employed. For example, egg powders, meat powders, vegetable powders and the like can be employed. Regardless of the flavor of the powder, it should be substantially insoluble in the other ingredients employed, namely those forming the aqueous liquid phase and the fat phase. Preserving the solid integrity of the savory flavor will assure a texture that is pleasing in the mouth and reminiscent of the natural product represented by the solid flavor.

The particle size of the solid phase ingredients is important to the final texture. The particle size is best determined organoleptically and is below the threshold at which graininess is perceived. Many materials form loose aggregates that break down in the mouth to sizes within these ranges and are acceptable according to the invention.

As stated above, sugar content, which in the case of the instant invention particularly involves lactose content, is a factor which can impair the ability of the cheese product to resist thermal degradation. Lactose may be present either as an added ingredient in the cheese filler or as a component of other ingredients. For example, whey typically may contain 30% by weight lactose. The total amount of lactose by weight based on the total weight of the cheese product of the instant invention should not exceed 20% and preferably should not exceed 15% by weight.

The process of the invention entails mixing the ingredients in a manner that provides a uniform blend having the noted desirable textural properties. The process is exemplified below.

Baked Dough Product

The preferred aspects of the invention are directed to a dough and savory filler composite product comprising at least one discrete region of a cheese product as described above and at least one discrete region of a dough, preferably baked to crisp texture. This enables the preparation of filled or topped baked goods like crackers, pastries, pretzels, crisps of various sizes and shapes, and the like.

The doughs can be formed on any of the equipment conventional, including laminators, extruders, depositors, rotary formers, wire cutters, and the like. Once the dough preform is formed, the savory product of the invention can be applied onto or into a dough preform in any manner suitable and the resulting composite baked or other wise cooked, e.g., fried, extruder heated, drum heated, or the like. The invention enables the baking of the dough to a crisp texture without degrading the savory filling to an extent that oil migrates to the baked dough to cause textural or color problems. The product will also not adversely affect the crisp texture of the baked good. The savory product can also be added to a baked good after the dough has been partially or fully baked. The invention has the above advantages and the further advantage that the baking process will be essentially the same as for the original product, adjusting only for differences in mass and geometry of the composite of dough and savory product. Conventional baking apparatus can be employed.

The term "dough" as used in this context includes all formulations that the person skilled in the art would consider dough. At a minimum, these formulations contain a starch component and at least sufficient water to hydrate the starch, both being employed in reasonable proportions. The starch component can be provided as whole grain or grain ground or refined to any desired degree. It can be supplied in the form of flour, e.g., from wheat, barley, corn, oats, rice, rye, treacle, and the like. Or the starch component can be supplied as a purified or mechanically refined or less than whole grain flour. The water can comprise water itself or an aqueous liquid such as milk (whole, skim, homogenized, buttermilk, soy), fruit or vegetable juice, and the like. Yeast or chemical leavenings are also typically present. Also typically, the dough will contain shortening in an amount suitable for achieving the textural characteristics desired for a given type of product. Also typical, is the use of at least some sweetener, though in limited amounts compatible with savory flavors. Sucrose and corn syrup are among the most typical. All conventional ingredients, typical for desired recipes, can be employed. For the sake of economy of description, the entire text of Manley, J. R.; *Technology of Biscuits, Crackers and Cookies*, Vols. 1 and 2, is incorporated herein by reference for its descriptions of conventional ingredients and processing.

In another aspect, the invention provides savory products as described above, packaged in sealed containers, e.g., of either rigid or flexible construction. In one embodiment, a flexible plastic tube is provided for squeezing the cheese or other savory product onto or into a cooked or raw food product for eating as is or after cooking. The process of packaging is not changed from what is typically known for products of like viscosity; however, the need for very sophisticated packages, such as aerosol containers, to maintain the freshness of the product is eliminated without reducing the convenience of the product.

The following examples are provided to further illustrate and explain a preferred form of the invention and are not to be taken as limiting in any regard. Unless otherwise indicated, all parts and percentages are by weight.

EXAMPLE 1

This example illustrates the preparation of a bakeable cheese filler according to a preferred aspect of the invention. The following ingredients are prepared according to the process that follows.

| Ingredient | Parts by Weight |
| --- | --- |
| Cheese Powder Flavor | 31.0 |
| Whey | 7.75 |
| Maltodextrin | 7.75 |
| Modified Starch | 4.65 |
| Reduced Polydextrose (70% in water) | 37.2 |
| Oil | 10.9 |
| Lactisol (1% solution) | 0.8 |

The glycerin(if present in formulation) and oil are added to an aqueous solution of reduced polydextrose and Super Envision brand lactisol, and the resulting mixture is stirred for two minutes at low speed. Then one quarter of the cheese is added resulting aqueous/oil mixture, and the resulting mixture is stirred for two minutes at low speed. The mixing bowl is then scraped to consolidate the resulting mixture. This step is repeated three more times to complete the addition of the cheese. The resulting savory cheese product is tasted to assure homogeneity and mixed additionally, as needed. The savory cheese product prepared in this manner has an $A_w$ of about 0.40. The savory cheese product exhibits a complex viscosity of about 10,000 to about 15,000, poises as measured by an Advanced Rheometric Expansion System (ARES), Model LS-M(Rheometric Scientific) at 25° C. and 0.1% strain. The savory cheese product is spread on two unbaked shredded wheat cracker preforms, and the resulting laminated half product is baked to provide a fully baked product. The savory cheese product maintained a smooth, creamy, lubricious mouthfeel and no oil was noted to separate and migrate into the cracker portion even after storage for several weeks at 70° F.

The cheese also exhibits minimal spread when tested by the following procedure.

Scope

This method will determine the spread of cheese fillers used in the cheese filled products upon baking.

Apparatus
1. Conventional air oven set at 300° F.
2. Pyrex glass baking pan (9"×12"×2")
3. Filter paper No.2, 12.5 cm diameter.
4. Teflon (or Steel) ring with 1¹¹⁄₁₆" inner diameter (ID) at bottom and 1½" ID at top and ¾" height.
5. Spatula
6. Timer
7. Caliper Reagents
1. Vegetable oil Procedure
1. Set oven to 300° F.
2. Place the filter paper inside the baking pan.
3. Line the inside of the steel ring with a thin layer of vegetable oil, then place the ring with 1¹⁄₁₆" opening face down onto the filter paper which was lay on the baking pan.
4. Using a spatula, fill the ring with fillers through the 1½" opening.
5. Scrape off excess filler from the top opening and make sure the surface is flat.
6. Carefully slide the ring off the filler deposit.
7. Place the baking pan in the 300° F. oven and make sure the baking pan is leveled.
8. Set timer for 10 minutes.
9. After 10 minutes, remove the baking pan from the oven and allow it cool to room temperature.
10. Use a caliper to measure the diameter of the filler deposit.
11. Record the results in xx.x cm.

Note
1. Filler sample should be prepared at room temperature.
2. Remove the dry layer if it forms at the surface. Carefully stir the filling sample well to assure that the sample is homogeneous. Do not stir too vigorously to have air bubbles entrapped in the filling.
3. Make sure there is no air entrapped inside the filler after filler is filled into the steel ring.
4. Some filler may be very sticky, it takes extra care and time to fill filler into the steel ring.
5. Discard samples if samples stick to the steel ring and do not maintain a good shape before sending into oven.
6. Make sure filler is placed in a flat and leveled surface.
6. Low viscosity filler may start to flow as soon as the steel ring is removed. Place the sample into the oven as quickly as possible and do not cause too much vibration.
7. Discard the result if the sample is unevenly spreading in the oven.

Dimension of Teflon Ring for Bake Spread Test

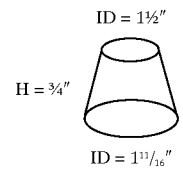

ID = 1½"
H = ¾"
ID = 1¹¹⁄₁₆"

EXAMPLE 2

This example illustrates the preparation of another bakeable cheese filler according to the invention. The following ingredients are prepared according to the process that follows.

| Ingredient | Parts by Weight |
| --- | --- |
| Cheese Powder Flavor | 40.1 |
| Reduced Polydextrose (70% in water) | 23.6 |
| Glycerin | 13.3 |
| Oil | 22.2 |
| Lactisol (1% Solution) | 0.75 |

Cheese filler prepared according to this Example, which had an $A_w$ of 0.40, was used to prepare filled cheese balls using an extrusion process. Both corn and wheat based doughs were employed as casing materials for the cheese filler. The extruder had a temperature at the tip of the die of approximately 325° F. After extrusion, the filled cheese balls were dried at a temperature of approximately 190° F. for 10–12 minutes. These extrusion conditions baked the dough, i.e., the starch within the dough was gelatinizing and raw flavor notes eliminated, yet the cheese filler was substantially unaffected by the extrusion process, and the baked casing retained its crisp texture.

EXAMPLE 3

This example illustrates the preparation of another bakeable cheese filler according to the invention. The following ingredients are prepared according to the process that follows.

| Ingredient | Parts by Weight |
| --- | --- |
| Cheese Powder Flavor | 57.7 |
| Glycerin | 23.1 |
| Oil | 8.5 |
| Water | 7.7 |
| Salt | 3.0 |

The salt is added to the water and, the glycerine and oil are then added to the aqueous solution of polydextrose, salt and potassium sorbate, and the resulting mixture is stirred for two minutes at low speed. Then one quarter of the cheese is added resulting aqueous/oil mixture, and the resulting mixture is stirred for two minutes at low speed. The mixing bowl is then scraped to consolidate the resulting mixture. This step is repeated three more times to complete the addition of the cheese. The resulting savory cheese product is tasted to assure homogeneity and mixed additionally, as needed. The savory cheese product prepared in this manner has an $A_w$, of about 0.40.

EXAMPLE 4

This example illustrates the preparation of another bakeable cheese filler according to the invention. The following ingredients are prepared according to the process that follows.

| Ingredient | Parts by Weight |
| --- | --- |
| Cheese Powder Flavor | 57.2 |
| Glycerin | 12.2 |
| Oil | 24.5 |
| Water | 4.5 |
| Salt | 1.6 |

The salt is added to the water, and the glycerin and oil are then added to the resulting aqueous solution, and the resulting mixture is stirred for two minutes at low speed. Then one quarter of the cheese is added resulting aqueous/oil mixture, and the resulting mixture is stirred for two minutes at low speed. The mixing bowl is then scraped to consolidate the resulting mixture. This step is repeated three more times to complete the addition of the cheese. The resulting savory cheese product is tasted to assure homogeneity and mixed additionally, as needed. The savory cheese product prepared in this manner has an $A_w$ of about 0.30

EXAMPLE 5

This example illustrates the preparation of another bakeable cheese filler according to the invention. The following ingredients are prepared according to the process that follows.

| Ingredient | Parts by Weight |
| --- | --- |
| Cheese Powder Flavor | 18.2 |
| Sorbitol | 27.2 |
| Glycerin | 12.1 |
| Oil | 3.0 |
| Water | 30.3 |
| Starch | 6.1 |
| Salt | 3.0 |
| Potassium Sorbate | 0.1 |

The salt, sorbital and potassium sorbate are added to the water, and the oil is added to the resulting water solution. Premix starch and glycerin are then added to the resulting solution and stirred until the starch is completely hydrated. Cheese powder is added with stirring to the resulting aqueous/oil mixture until the mixture homogeneous. The savory cheese product prepared in this manner has an Aw of about 0.7.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A savory, smooth-textured, bakeable and shelf-stable cheese product, which is bake stable at temperatures of up to 115° C.±5° C. comprising:

a) a dispersed fat phase comprised of triglyceride fat in an amount of from 0.5% to 40% by weight of the total weight of the cheese product;

b) an aqueous liquid phase comprising water in an amount of at least 3% by weight based on the total weight of the cheese product and a plasticizing polyhydric alcohol in an amount of at least 50% by weight of the aqueous phase and dissolved soluble solids, the combined amount of the plasticizing polyhydric alcohol and the dissolved soluble solids being sufficient to provide the total cheese product with an $A_w$ of less than 0.8, and c) a solids phase, containing cheese flavor in an amount sufficient to comprise at least 15% by weight of the total weight of the cheese product;

d) not more than 20% by weight lactose based on the total weight of the cheese product.

2. A savory, smooth-textured, bakeable and shelf-stable cheese product according to claim 1, wherein the dispersed fat phase comprises from 3 to 40% of the savory cheese product.

3. A savory, smooth-textured, bakeable and shelf-stable cheese product according to claim 1, wherein the aqueous liquid phase comprises from 20 to 40% and comprises a plasticizing polyhydric alcohol in an amount of at least 50% by weight of the aqueous phase and dissolved soluble solids, the combined amount of the plasticizing polyhydric alcohol and the dissolved soluble solids being sufficient to provide the total savory product with an $A_w$ of less than 0.5 and a complex viscosity which upon being raised to a temperature of 115° C. increases by less than a factor of ten.

4. A savory, smooth-textured, bakeable and shelf-stable cheese product according to claim 1, wherein the solids phase comprises from 15 to 65% of a savory flavoring.

5. A savory, smooth-textured, bakeable and shelf-stable cheese product according to claim 1, wherein the solids phase contains cheese powder in an amount of from 30 to 65% of the weight of the savory cheese product.

6. A savory, smooth-textured, bakeable and shelf-stable cheese product according to claim 1, wherein:

the fat phase comprises from 7 to 30% by weight of the product and comprises a partially hydrogenated vegetable oil having an SFI profile exhibiting solids contents in the following ranges

| Temperatures | Solids (%) |
| --- | --- |
| 50° F. | 9 to 50 |
| 70° F. | 2 to 25 |
| 92° F. | 8 maximum | the aqueous phase comprises glycerol and comprises from 25 to 35% by weight of the product.

7. A savory, smooth-textured, bakeable and shelf-stable cheese product according to claim 6, wherein the aqueous liquid phase comprises a plasticizing polyhydric alcohol in an amount of at least 50% by weight of the aqueous phase and dissolved soluble solids, the combined amount of the plasticizing polyhydric alcohol and the dissolved soluble solids being sufficient to provide the total savory product with an $A_w$ of less than 0.55.

8. A savory, smooth-textured) bakeable and shelf-stable cheese product according to claim 7, wherein the $A_w$ is within the range of from 0.30 to 0.45.

9. A process for preparing a savory, smooth-textured, bakeable and shelf-stable cheese product, which is bake stable at temperatures of up to 115° C.±5° C., comprising:

providing ingredients for forming a) a dispersed fat phase comprised of triglyceride fat in an amount of at least 0.5% by weight of the total weight of the cheese product; b) an aqueous liquid phase comprising a plasticizing polyhydric alcohol in an amount of at least 50% by weight of the aqueous phase and dissolved soluble solids, the combined amount of the plasticizing polyhydric alcohol and the dissolved soluble solids being sufficient to provide the total cheese product with an $A_w$ of less than 0.8, and c) a solids phase, containing cheese flavor in an amount sufficient to comprise at least 5% by weight of the total weight of the cheese product; and wherein water is present in an amount of at least 3% by weight based on the total weight of the cheese product and wherein not more than 20% by weight of the cheese product is lactose;

and mixing the ingredients sufficiently to provide a uniform blend.

10. A process according to claim 9, wherein the dispersed fat phase comprises from 3 to 40% of the savory product, and the aqueous liquid phase comprises from 20 to 40% and comprises a plasticizing polyhydric alcohol in an amount of at least 50% by weight of the aqueous phase and dissolved soluble solids, the combined amount of the plasticizing polyhydric alcohol and the dissolved soluble solids being sufficient to provide the total savory product with an $A_w$ of less than 0.50 and a complex viscosity of within the range of from about 400 to about 20,000 poises and 0.1% strain and which upon being raised to a temperature of about 115° C. undergoes a viscosity increase by a factor of less than about 10.

11. A process according to claim 9, wherein the solids phase comprises from 15 to 65% of a savory flavoring.

12. A process according to claim 9, wherein:

the solids phase contains cheese flavor in an amount of at least 8% by weight based on the weight of the cheese product.

13. A process according to claim 9, wherein:

the fat phase comprises from 7 to 30% by weight of the product and comprises a partially hydrogenated vegetable oil having an SFI profile exhibiting solids contents in the following ranges

| Temperatures | Solids (%) |
| --- | --- |
| 50° F. | 9 to 50 |
| 70° F. | 2 to 25 |
| 92° F. | 8 maximum | the aqueous phase comprises glycerol and comprises from 25 to 35% by weight of the product, and the solids phase comprises from 35 to 60% by weight of the product.

14. A process according to claim 13, wherein the aqueous liquid phase comprises a plasticizing polyhydric alcohol in an amount of at least 50% by weight of the aqueous phase and dissolved soluble solids, the combined amount of the plasticizing polyhydric alcohol and the dissolved soluble solids being sufficient to provide the total savory product with an $A_w$ of less than 0.55 and a phase viscosity of within the range of from about 5 to about 30 poises at 25° C. and stress from 0.2 to 1000 dyne/cm$^1$.

15. A process according to claim 14, wherein the $A_w$ is less than 0.45.

16. A process according to claim 15, further including the steps of filling a flexible plastic tube with the savory product and sealing the tube.

17. A savory product comprising:

a) from 2 to 40% of a dispersed fat phase by weight of the total weight of the savory product;

b) from 20 to 40% of an aqueous liquid phase comprising a plasticizing polyhydric alcohol in an amount of at least 50% by weight of the aqueous phase and dissolved soluble solids, the combined amount of the plasticizing polyhydric alcohol and the dissolved soluble solids being sufficient to provide the total savory product with an $A_w$ of less than 0.75; and c) from 15 to 65% of a solids phase, containing a savory flavoring; and d) wherein water is present in an amount of at least 3% by weight based on the total weight of the savory product and wherein not more than 20% by weight of the savory product is lactose.

18. A savory product according to claim 17, wherein:
the fat phase comprises from 7 to 40% by weight of the product and comprises a partially hydrogenated vegetable oil having an SFI profile exhibiting solids contents in the following ranges

| Temperatures | Solids (%) |
| --- | --- |
| 50° F. | 9 to 50 |
| 70° F. | 2 to 25 |
| 92° F. | 8 maximum | the aqueous phase comprises glycerol and comprises from 25 to 35% by weight of the product, and the savory flavor is in the form of an undissolved solid and comprises from 35 to 65% by weight of the savory product.

19. A process for preparing a savory, smooth-textured, bakeable and shelf-stable product according to claim 17, comprising:
providing the ingredients indicated; and
mixing the ingredients sufficiently to provide a uniform blend.

20. A packaged product comprising a product prepared according to the process of claim 9, comprising a fluid mixture of said product within a sealed container.

21. A composite product comprising:
a savory product prepared according to the process of claim 9 and an unbaked dough composition.

22. A composite product comprising:
a savory product prepared according to the process of claim 9 and an extruded starch containing dough, wherein the dough and savory product are coextruded and wherein as a result of the extrusion process the starch content of the dough is gelatinized, raw flavor notes found in the unbaked dough are eliminated, and the savory product is substantially unchanged by the extrusion process.

23. A process for preparing a composite food product comprising:
applying a savory product prepared according to the process of claim 9 to an unbaked dough, and extruding the dough and savory product.

* * * * *